(12) United States Patent
Blanding et al.

(10) Patent No.: US 8,505,019 B1
(45) Date of Patent: Aug. 6, 2013

(54) SYSTEM AND METHOD FOR INSTANT CAPACITY/WORKLOAD MANAGEMENT INTEGRATION

(75) Inventors: William H. Blanding, Bow, NH (US); Robert A. Viveney, Brookline, NH (US); Thomas Edwin Turicchi, Jr., Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1314 days.

(21) Appl. No.: 12/289,680

(22) Filed: Oct. 31, 2008

(51) Int. Cl.
*G06F 9/46* (2006.01)

(52) U.S. Cl.
USPC .......................................................... 718/104

(58) Field of Classification Search
None
See application file for complete search history.

(56) References Cited

U.S. PATENT DOCUMENTS

| 2004/0158834 A1* | 8/2004 | Ham et al. ..................... 718/104 |
| 2005/0262309 A1* | 11/2005 | Frey et al. ..................... 711/141 |
| 2006/0190482 A1* | 8/2006 | Kishan et al. ............. 707/103 Y |
| 2008/0271030 A1* | 10/2008 | Herington ..................... 718/104 |
| 2009/0228592 A1* | 9/2009 | Snyder ......................... 709/226 |

* cited by examiner

Primary Examiner — Camquy Truong

(57) ABSTRACT

A system, and a corresponding method, implemented on a processor, is used for assigning and reassigning instant capacity (iCAP) resources and non-iCAP resources in a computer system. The system includes a workload management system (WLMS) that monitors and controls the iCAP and the non-iCAP resources; an iCAP system available to monitor and control the iCAP resources; and an iCAP-WLMS integration system that transfers iCAP monitoring and control functions from the iCAP system to the WLM system, where the transfer creates a workload management (WLM) special mode of operation of the computer system, and where the WLMS monitors and assigns iCAP resources when in the WLM special mode.

21 Claims, 4 Drawing Sheets

SYSTEM AND METHOD FOR INSTANT CAPACITY/WORKLOAD MANAGEMENT INTEGRATION

BACKGROUND

A computer system may employ resources, such as processors, for which the computer system user has acquired full usage rights (purchase or lease), and other metered resources for which limited usage rights are acquired for temporary use of the metered resources. One class of metered resources are instant capacity resources. One sub-class of instant capacity resources are Temporary Instant Capacity (TiCAP) resources.

To monitor and control allocation and operation of these instant capacity resources, the computer system may have installed a instant capacity management system. The instant capacity management system may receive requests from other management software to assign or reassign instant capacity resources so that workloads executing on the computer system achieve their specified performance targets. The software initiating the requests may be workload management system software, which is installed to monitor the performance of the executing workloads. This split of functions between two software regimes inherently detracts from the overall efficient operation of the computer system.

SUMMARY

What is disclosed is a system, implemented on a processor, for assigning and reassigning instant capacity (iCAP) resources and non-iCAP resources in a computer system, comprising a workload management system (WLMS) that monitors and controls the iCAP and the non-iCAP resources; an iCAP system available to monitor and control the iCAP resources; and an iCAP-WLMS integration system that transfers iCAP monitoring and control functions from the iCAP system to the WLM system, wherein the transfer creates a workload management (WLM) special mode of operation of the computer system, and wherein the WLMS monitors and assigns iCAP resources when in the WLM special mode.

DESCRIPTION OF THE DRAWINGS

The Detailed Description will refer to the following figures in which like numbers refer to like objects, and in which.

DETAILED DESCRIPTION

Figure 1:
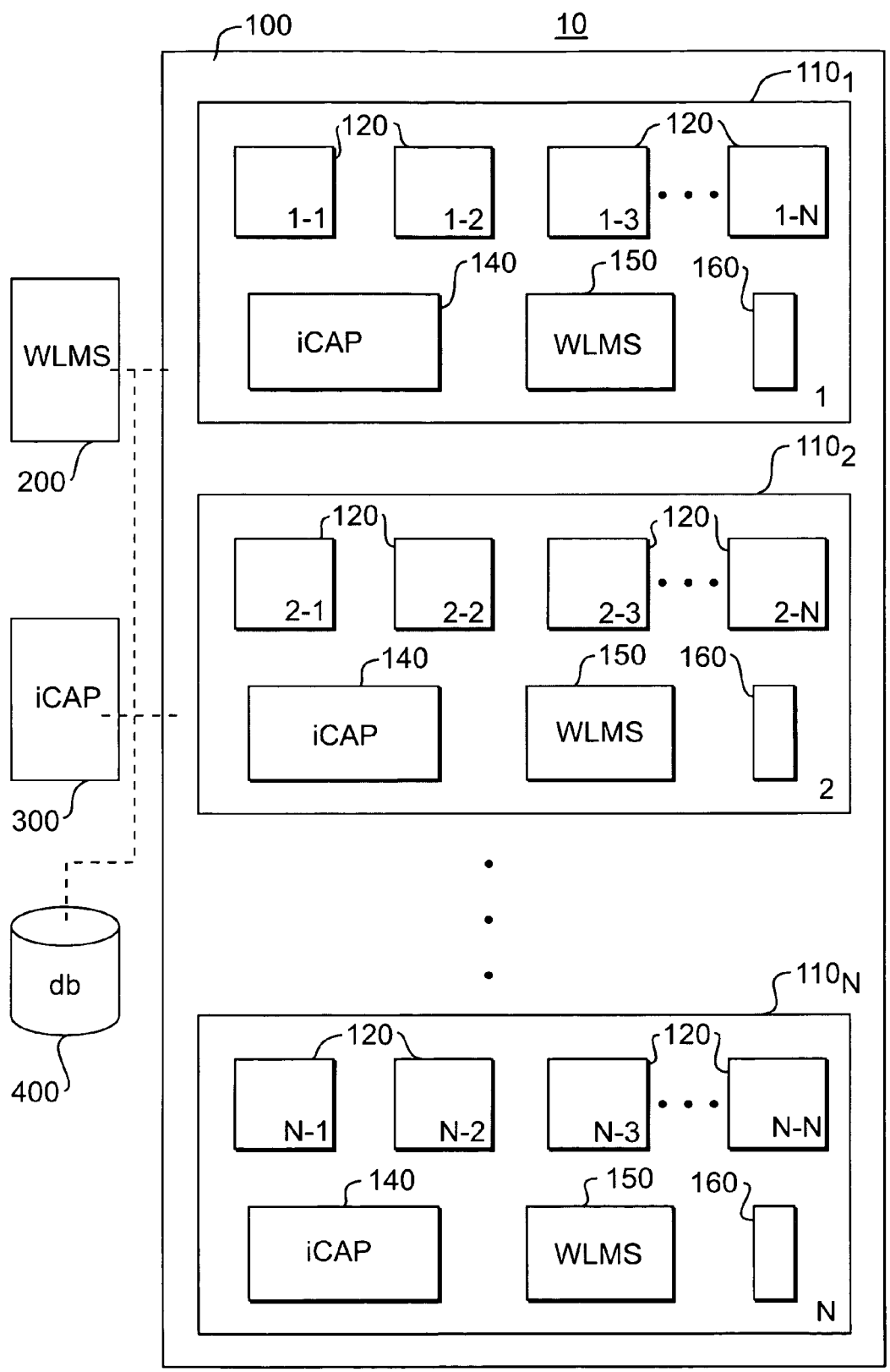
FIG. 1 illustrates an exemplary architecture for improving the efficient assignment and reassignment of instant capacity resources in a computer system.

Workload management software functions by monitoring the operation of computing workloads, predicting the resources needed to keep the operating parameters of each such workload near user-specified targets, allocating available resources in accordance with predicted resource requirements and user specified priorities, and then reassigning resources as appropriate to ensure the workloads receive the resources that have been allocated to the workloads.

One method for assigning and for reassigning resources among workloads involves the use of instant capacity resources and associated instant capacity software. Instant capacity resources consist of computer resources (processors, memory) installed in one or more computer system partitions in excess of the necessary usage rights, or licenses, available. Instant capacity software provides the ability to move or reassign the available usage rights so that instant capacity resources may be selectively activated, deactivated and reactivated as necessary to satisfy resource demands in different partitions. Operation of the instant capacity software entails maintaining an accurate record of the licensing state of all partitions, ensuring that actual instant capacity resource activation is compliant with the instant capacity license requirements, and coordinating and synchronizing the reassignment of instant capacity resources among the different partitions. The configuration state of the instant capacity resources will be referred to hereafter as the instant capacity persistent state. A computer system implementing an instant capacity system is considered compliant with its instant capacity license requirements as long as the number of instant capacity resources to be activated is consistent with what the computer system user has paid for.

As a result of these operational requirements of the instant capacity software, instant capacity resource assignment/reassignment can be time consuming. Once a new resource allocation has been made, any delays in transferring resources from lower to higher priority workloads will reduce the effectiveness of workload management and the efficiency of the computer system operations.

For example, when a workload management system is monitoring multiple workloads and decides that an instant capacity processor needs to be used by a first workload as opposed to a second workload, the workload management system may communicate with the instant capacity software responsible for the workload and request that the instant capacity software turn off the instant capacity processor. The instant capacity software then executes this deactivation request. Next, the workload management system requests that the instant capacity software responsible for the second workload activate the previously deactivated processor. The instant capacity software then reactivates the processor so that it support execution of the second workload.

To overcome these limitations with using instant capacity software to monitor and control all transfer functions, an improved workload management system disclosed herein provides for coordination between the workload management system and the instant capacity software so that instant capacity resource reassignments can be accomplished in the minimum time possible, thus making needed resources available to high priority workloads as quickly as possible. This coordination, or integration, of workload management system components and instant capacity system components is termed, hereafter, as a workload management (WLM) special mode (of operation), and the components that make the WLM special mode possible comprise an instant capacity/workload management (iCAP/WLMS) integration system.

FIG. 1 illustrates an exemplary architecture 10 implemented in whole or in part on a single server 100 for improving the efficient assignment and reassignment of instant capacity resources among partitions in the server 100 by making possible the WLM special mode. As part of the architecture 10, the server 100 has installed, or made accessible, a workload management system (WLMS) 200 and an instant capacity (iCAP) system 300. The WLMS 200 performs many resource monitoring and control functions. The WLMS 200 is an automated resource management system that may be used to monitor and control execution of workloads and consumption of full-usage right resources in the server 100. Although the WLMS 200 typically will monitor and control processor resources, the WLMS 200 may be used to monitor and control other shared computing system resources, including, for example, memory, bandwidth, and storage capacity used by a computer system.

Because the WLMS 200 is a computer-implemented, automated system, it allows users to more precisely manage consumption of computing resources by workloads than is possible by current manual means. The WLMS 200 also may provide computer system users with real-time or near real-time information as to computer system resource consumption. Such information is provided, for example, using a graphical user interface.

The iCAP system 300 primarily controls assignment and reassignment of instant capacity resources installed in the partitions of the server 100. The iCAP system 300 may be responsible for monitoring the state of compliance of the server 100 with any implemented instant capacity regimes. Thus, for example, the server 100 may have installed eight instant capacity processors, but the implemented regime may require that no more than four total instant capacity processor be active at any one time. The iCAP system 300 has access to this requirement, monitors operation of the server 100 to determine compliance with the requirement, and records actual usage of the instant capacity processor for accountability purposes.

The WLMS 200 can access the iCAP license requirements (the license elements being stored, for example, in the database 400) and thus has "knowledge" of which iCAP configurations are compliant with the license requirements. Furthermore, the WLMS 200 has continuous access to the entire resource configuration on the server 100. By contrast, the iCAP system 300 has a more limited view of resource configurations, being primarily responsible for the iCAP resource configuration. Thus, the WLMS 200, when properly empowered, can more efficiently assign/reassign iCAP resources than can the iCAP system 300 itself. To thus empower the WLMS 200, the iCAP system 300 must delegate some of its responsibilities to the WLMS 200. More specifically, the "decision" as to when some of the licensing compliance checks and persistent state data read and store operations are to be performed by the iCAP system 300 may be shifted to the WLMS 200, thereby achieving a reduction in time to reassign iCAP resources. In another embodiment, however, the actual compliance checks and persistent state read and store operations also may be shifted from the iCAP 300 to the WLMS 200.

As noted above, the architecture 10 incorporates features that make possible the WLM special mode of operation so that the WLMS 200 may take advantage of its special knowledge of the state of the entire server 100 to accomplish a rapid reconfiguration of iCAP resources by avoiding redundant and/or serialized iCAP operations associated with sole iCAP control of iCAP resource allocation and reallocation. In using this WLM special mode, the WLMS 200 takes temporary control of certain functions for maintaining the server 100 compliant with iCAP licensing requirements. This is necessary to ensure that users have used only those resources for which they have paid. In particular, it is important that the server 100 is left in a compliant state when the WLM special mode is terminated. Otherwise, users may be denied use of part or all of a server 100 until a compliant state is restored.

To effectuate this temporary transfer of functions, the WLMS 200 maintains agent software (part of the WLMS 150) in each managed partition of the server 100. These agents obtain iCAP state information for each partition and intercommunicate with each others so that the WLMS 200 can perform a unified resource allocation consistent with iCAP license requirements and compliance restrictions. Using this architecture 10, the iCAP resource allocation/reallocation process to be described replaces the relatively slow, serialized stream of resource reassignment operations that would have been performed solely by the iCAP system 300 executing within the individual partitions of the server 100.

As can be seen form FIG. 1, the exemplary server 100 is divided into N partitions 110 (i.e., partitions $110_1$-$110_N$). Within each partition $110_i$, a number of processors 120 are installed. One or more of these processors may be a full-usage rights processor, and other processors 120 may be iCAP processors. At any one time, and in any one partition, both a full usage rights processor and an instant capacity processor may be active. The instant capacity regime implemented on the server 100 will dictate the allowable combination of activated full usage right processors and iCAP processors for each of the partitions 110 within the server 100.

Each partition $110_i$ within the server 100 also includes software 150 and 140, respectively, for communication with the WLMS 200 and the iCAP system 300 and to execute the functions of the WLMS 200 and the iCAP system 300, as needed. Finally, each partition $110_i$ includes configuration memory 160 in which is installed the allowable processor configuration for that partition $110_i$. The configuration memory 160 is not accessible by the computer system user, and cannot be altered by the computer system user either directly or through other computer system programs. The configuration memory 160 also is used to record the current state of processor utilization for the partition $110_i$, and constitutes a non-volatile, persistent record of the current state and any prior states until such record is downloaded to database 400 by the iCAP software 140.

Figure 2:
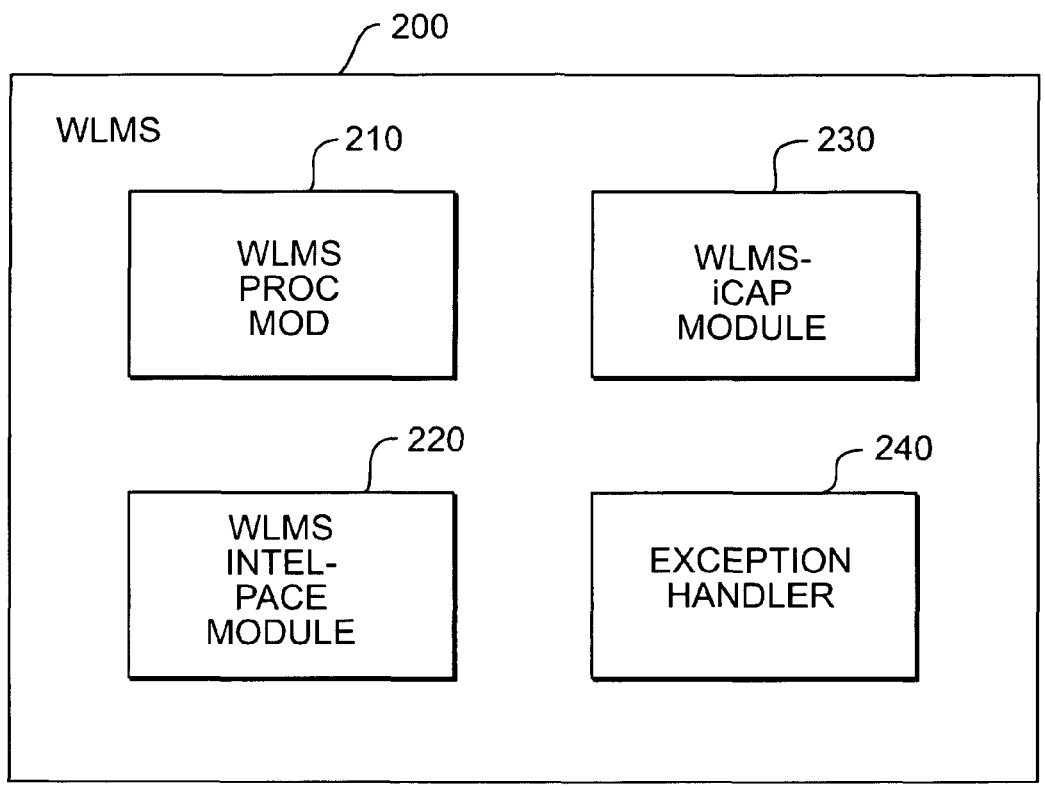
FIG. 2 is a block diagram showing additional details of the architecture of FIG. 1.
Figure 3:
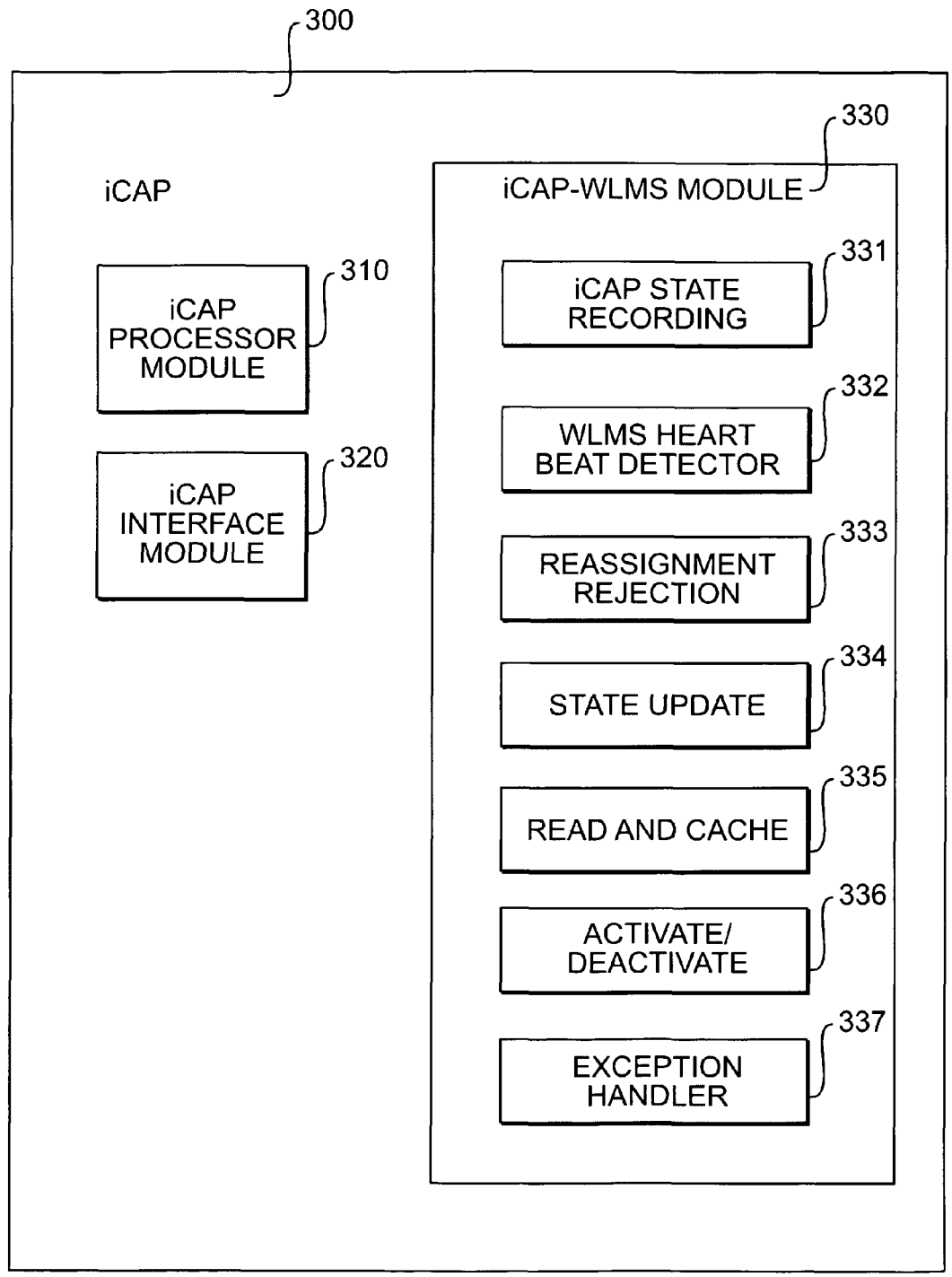
FIG. 3 is another block diagram showing additional details of the architecture of FIG. 1.

FIGS. 2 and 3 are block diagrams of exemplary configurations of the WLMS 200 and the iCAP system 300 of FIG. 1. In FIG. 2, the WLMS 200 is shown to include a processor module 210, an interface module 220, an WLMS-iCAP integration module 230 and an exception handler 240. The processor module 210 includes programming to execute typical WLMS functions including monitoring all workloads executing on the server 100, collecting performance metrics, and assigning and reassigning resources among the workloads. The interface module 220 includes programming to execute machine-to-machine communications, including communications with the database 400 and the iCAP system 300, as well as the WLMS modules 150 and iCAP modules 140 installed in the partitions 110. The interface module 220 also provides for machine-to-man communications; for example, providing a report on performance metrics by way of a graphical user interface. The WLMS-iCAP module 230 provides the specific programming to allow the WLMS 200 to assume certain iCAP functions that previously had been performed by the iCAP system 300 alone. Thus, the WLMS-iCAP module 230 is one element of the architecture 10 that provides a special mode of operation of the WLMS 200 and the iCAP system 300 such that allocation and reallocation of instant capacity resources among the partitions 110 is made as efficient as possible, and certainly more expeditious than would be possible with the iCAP system 300 operating alone. Finally, the WLMS-iCAP module 230 includes exception handler 240, which includes programming to recognize exception conditions associated with the allocation and reallocation of iCAP resources, and to recover from these exception conditions.

In FIG. 3, the iCAP system 300 is shown to include a processor module 310, an interface module 320, and iCAP-WLMS integration module 330. The processor module 310 includes programming to execute typical iCAP functions including monitoring all iCAP resources supporting workloads executing on the server 100, collecting iCAP usage information, and assigning and reassigning iCAP resources among the workloads. The interface module 320 includes programming to execute machine-to-machine communications, including communications with the database 400 and the WLMS 200, as well as the WLMS modules 150 and iCAP modules 140 installed in the partitions 110. The interface module 320 also provides for machine-to-man communications; for example, providing an iCAP resources usage report by way of a graphical user interface. The iCAP-WLMS integration module 330 provides the specific programming to allow the WLMS 200 to assume certain iCAP functions that previously had been performed by the iCAP system 300 alone. Thus, the iCAP-WLMS integration module 330 is one element of the architecture 10 that provides the WLM special mode of operation of the WLMS 200 and the iCAP system 300 such that allocation and reallocation of instant capacity resources among the partitions 110 is made as efficient as possible, and certainly more expeditious than would be possible with the iCAP system 300 operating alone.

The iCAP-WLMS integration module 330 includes several sub-modules to effectuate the special mode of operation of the iCAP system 300 and the WLMS 200. These sub-modules include a persistent iCAP state recording module 331, a WLMS heartbeat monitor 332, a reassignment rejection module 333, a state update module 334, a persistent state read and cache module 335, an activate/deactivate module 336, and exception handler 337.

The iCAP state recording module 331 provides programming by which each iCAP system 150 in each partition 110 may persistently record, in a manner accessible to all other systems 150, that it is able to support the WLM special mode. The module 331 also allows the system to persistently records when its associated partition 110 is in the WLM special mode.

The heartbeat monitor 332 monitors heartbeat data from the WLMS 200 and the individual WLMS systems 150 installed in the partitions 110. The heartbeat data may be used by other components of the architecture 10 to determine if the WLMS 200 is operating as intended.

The reassignment rejection module 333 includes programming that requires the iCAP system 300 to reject any iCAP resource reassignment requests not originating from the WLMS 200 when the WLM special mode is in effect. This feature prevents a non-compliant iCAP state from occurring as a result of user execution of iCAP commands.

The state update module 334 allows the server 100, when operating in the WLM special mode to support a command by which an iCAP persistent state may be updated with new compliance information for all partitions using a cached version of the persistent state as needed to avoid the necessity of reading the persistent state as a precursor step to performing the iCAP resource reassignment.

The read and cache module 335 allows the iCAP system 300, when operating in the WLM special mode, to read and cache the iCAP persistent state. This command allows the WLMS 200 to obtain the iCAP persistent state data in a way that does not add to the iCAP resource reassignment critical path.

The activate/deactivate module 336 allows the iCAP system 300 to support commands by which iCAP resources can be activated or reactivated without requiring compliance checks or updating the iCAP persistent state. This module 335 further allows the WLMS 200 to use its "knowledge" of iCAP compliance to substitute for what otherwise would be the normal compliance checks and state updates conducted by the iCAP system 300 when the server 100 (the WLMS 200 and the iCAP system 300) is not operating in the WLM special mode.

The exception handler 337 includes programming to recognize exception conditions associated with the allocation and reallocation of iCAP resources, and to recover from these exception conditions.

These modules 230 and 330-337 are used by the WLMS 200 as follows. The WLMS 200 places the iCAP system 300 into the WLM special mode and requests that iCAP persistent data be read and cached. This defines the initial iCAP compliant state. Once the WLM special mode is active, only the WLMS 200 may manipulate the iCAP state (i.e., assign/reassign iCAP resources). Thereafter the WLMS 200 performs periodic data sampling and iCAP resource allocation. Following an allocation, the WLMS 200 requests deactivation of iCAP resources without the need for an iCAP persistent state update in individual partitions 110 as dictated by the iCAP resource allocation. Since iCAP resource deactivations will not change a compliant iCAP state into a non-compliant state, iCAP compliance is maintained whatever the outcome of these allocation operations.

If an iCAP resource deactivation is successful, the WLMS 200 requests a single update of the iCAP persistent state to reflect the new intended iCAP resource configuration—i.e., the deactivations that have just been accomplished and the activations that are about to follow. This update uses the most recently written iCAP persistent state as a starting point so that reading the current iCAP state is not necessary. Since the successful deactivations will have reduced the actual active resources in each partition to be less than or equal to both the new and the old compliance data, the server 100 should be iCAP compliant both before and after this operation. Only one iCAP persistent state update is required in every resource management interval. Performance may be further improved by skipping iCAP persistent state updates or doing the updates out of order, at the risk of having to depend upon compliance recovery procedures in the event of an abnormal termination of the WLM special mode.

The WLMS 200 requests activation of iCAP resources in individual partitions without an iCAP persistent state update as dictated by the resource allocation and in accordance with the updated iCAP resource configuration just written. As long as these activation operations are consistent with the just updated iCAP persistent state, the server 100 will remain in compliance. Since the configuration data was determined from the known and completed deactivation operations and the known and intended activation operations, there is no window of non-compliance that may be exploited, or within which catastrophic failure will leave the system in a non-compliant state.

On normal shut down of WLMS 200, the WLM special mode is exited in each server partition 110 with the server 100 in a compliant state, thus accomplishing normal termination of WLM special mode.

The exception conditions that may occur in the WLM special mode include failure of one or more resource deactivations. In this case, the iCAP configuration may only be updated by the WLMS 200 to reflect the actual deactivations and the intended activations must be adjusted to maintain compliance.

Another exception condition involves failure of one or more resource activations. In this case, the already written iCAP state remains compliant.

Still another exception condition involves failure of an iCAP persistent data update. As long as this operation fails atomically, the server 100 remains iCAP compliant. As an example of an failing atomically, if the current iCAP state is 4, 3, 2, 1, and the intended iCAP state is 1, 2, 3, 4, then as long as the configuration after update is either 4, 3, 2, 1 or 1, 2, 3, 4, the operation has failed atomically. In this case, the previous iCAP state remains in effect, and only activations that are consistent with the previous iCAP state may be performed.

Yet another exception condition involves asynchronous shutdown of WLM special mode. Here, asynchronous shutdown of the WLM special mode means shutdown of less than all the software and hardware components that operate to support the WLM special mode. For example, each partition in the server 100 operates in the WLM special mode, and if only one such partition leaves the WLM special mode, an asynchronous shutdown of the WLM special mode has occurred. As long as iCAP persistent data updates are performed atomically, an asynchronous exit from the WLM special mode should leave the server 100 iCAP compliant. The WLMS 200 could either attempt to re-enter the WLM special mode, or perform management using standard iCAP functions, but with reduced performance.

One more exception condition involves asynchronous shutdown of the WLMS 200. As long as iCAP persistent data updates are performed atomically, an asynchronous failure of the WLMS 200 should leave the server 100 iCAP compliant. A manual method of exiting WLM special mode may be required in this situation.

Figure 4:
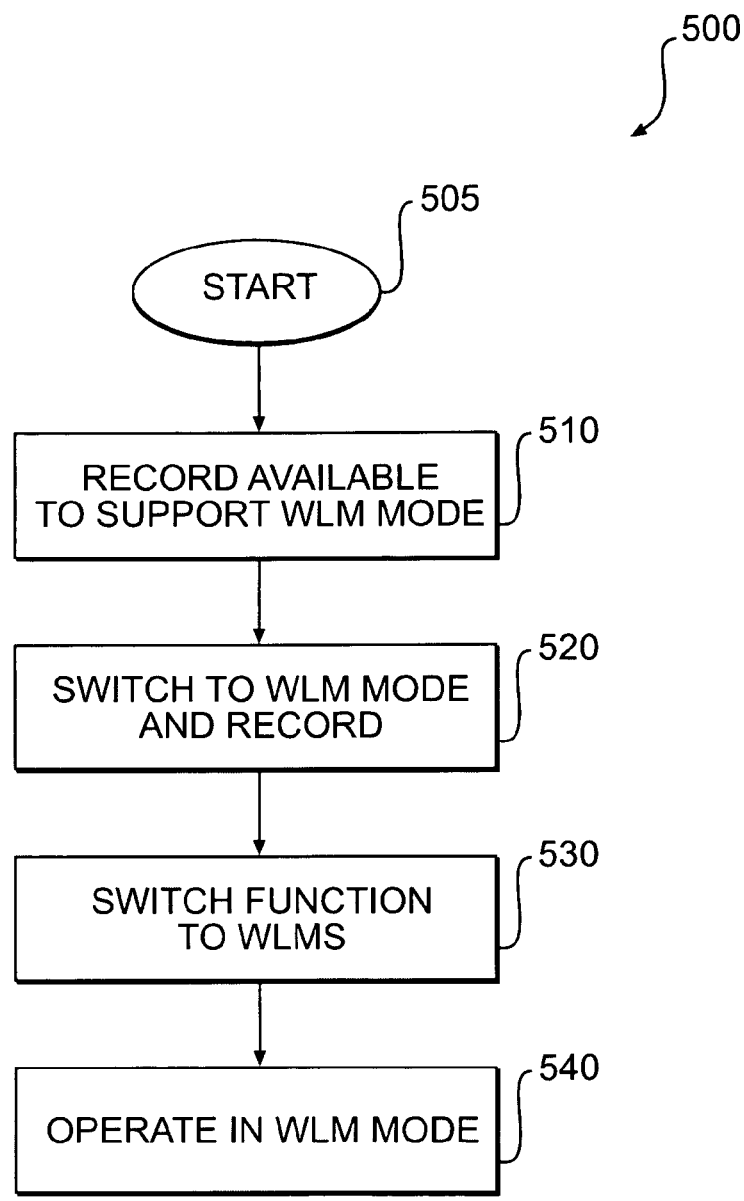
FIG. 4 is a flowchart illustrating exemplary operations of components of the architecture of FIG. 1.

FIG. 4 is a flowchart an illustrating exemplary operation 500 of the WLMS-iCAP integration system. The operation 500 begins in block 505 with the iCAP system 300 and the WLMS 200 operating in independent modes. In block 510, the iCAP system 150 in each partition 110 records its ability to support the WLM special mode. In block 520, the iCAP system 150 switches to the WLM special mode, and records the switch. In block 530, the iCAP system 300 switches certain functions to the WLMS 200. In block 540, the WLMS 200 issues assignment/reassignment orders to the iCAP resources.

The various disclosed embodiments may be implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from a long-term storage media of some type, such as semiconductor, magnetic, and optical devices, including a removable disk or a hard drive. The code may be distributed on such media, or may be distributed to network operators from the memory or storage of one computer system over a network of some type to other computer systems for use by operators of such other systems. Alternatively, the programming code is embodied in the memory (such as memory of a handheld portable electronic device) and accessed by a processor using a bus. The techniques and methods for embodying software programming code in memory, on physical media, and/or distributing software code via networks are well known and will not be further discussed herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A system for assigning and reassigning instant capacity (iCAP) resources and non-iCAP resources in a computer system, comprising:
   a processor to execute instructions for:
   a workload management system (WLMS) that monitors and controls the iCAP and the non-iCAP resources;
   an iCAP system available to monitor and control the iCAP resources, wherein usage of each of the iCAP resources is controlled for compliance with specific usage rights or licenses; and
   an iCAP-WLMS integration system that transfers iCAP monitoring and control functions from the iCAP system to the WLMS system, wherein the transfer creates a workload management (WLM) special mode of operation of the computer system, and wherein the WLMS monitors and assigns iCAP resources when in the WLM special mode.

2. The system of claim 1, wherein the computer system is a server, the iCAP resources and the non-iCAP resources are processors, wherein the server comprises two or more partitions among which the processors are distributed, and wherein the monitoring and control functions to be transferred comprises decision-making regarding execution of iCAP compliance checks and persistent state read and store operations.

3. The system of claim 2, wherein the iCAP system comprises individual iCAP modules in each partition and the WLMS system comprises individual WLMS modules in each partition, wherein the individual iCAP and WLMS modules control the processors in their respective partitions.

4. The system of claim 2, wherein the partitions are virtual partitions.

5. The system of claim 1, wherein the iCAP-WLMS integration system comprises:
   means for reading a current state of the iCAP resources;
   means for storing the current state of the iCAP resources; and
   means for designating and effectuating a change to the current state of the iCAP resources.

6. The system of claim 5, wherein the means for designating and effectuating a change comprises means for determining when one or more iCAP resources are needed to support workload demands in the computer system, wherein the WLMS system initiates transfer to the WLM special mode.

7. The system of claim 1, wherein the iCAP-WLMS integration system comprises:
   means for persistently recording availability to support the WLM special mode; and
   means for persistently recording operation in the WLM special mode.

8. The system of claim 1, wherein the iCAP-WLMS integration system comprises means for detecting the health of the WLMS.

9. The system of claim 8, further comprising means for exiting the WLM special mode when the means for detecting the health of the WLMS indicates an unsatisfactory condition.

10. The system of claim 1, wherein the iCAP-WLMS integration system comprises:
    means for activating the individual iCAP modules in each partition to initiate transfer into in the WLM special mode, wherein when all individual iCAP modules are activated, the WLM special mode transfer is complete; and means for deactivating the iCAP modules in each partition from the WLM special mode.

11. The system of claim 1, wherein iCAP-WLMS integration system comprises an exception handler, wherein the exception handler operates to maintain an iCAP compliant state upon failure to correctly transfer to and from the WLM special mode.

12. A method, executed on a programmed computer, for integrating a workload management system (WLMS) and an instant capacity (iCAP) system for control of computer system iCAP resources, wherein the computer system comprises two or more partitions, the iCAP resources are distributed among the partitions, and each partition includes an individual WLMS module and an individual iCAP module, the method, comprising:

reading each individual iCAP module within the partitions to determine availability for transfer of resource control from the iCAP module to the WLMS module, wherein usage of each of the iCAP resources is controlled for compliance with specific usage rights or licenses;

when all individual iCAP modules indicate availability for transfer, commanding the individual iCAP modules to transfer control of iCAP resources within their respective partitions to the corresponding WLMS module; and when all iCAP modules complete the control transfer, operating in a special workload management (WLM) mode of operation in which the iCAP resources within the computer system have workload assigned by the WLMS.

13. The method of claim 12, further comprising:

receiving a command, by each of the individual iCAP modules, to leave the WLM special mode;

in response to the command to leave the WLM special mode, reasserting, by the individual iCAP modules, control over the iCAP resources; and when all iCAP modules have reasserted control, leaving the WLM special mode, whereby the iCAP system receives control of the iCAP resources.

14. The method of claim 12, wherein the WLMS, when the WLM special mode is activated, activates and deactivates iCAP resources without iCAP compliance checks and without iCAP state updates; and wherein transferring resource control comprises transferring decision-making authority regarding execution of iCAP compliance checks and persistent state read and store operations from the iCAP system to the WLMS.

15. The method of claim 14, further comprising;

determining and storing an iCAP persistent state upon transfer to the WLM special mode, whereby a starting iCAP compliant state is defined; and updating the starting iCAP compliant state and storing the updated starting iCAP compliant state after activation of an iCAP resource.

16. The method of claim 12, further comprising:

monitoring a WLMS heartbeat in each partition; and when the WLMS heartbeat in any one partition is not detected, initiating an asynchronous shutdown of the WLM special mode.

17. A system, implemented as programming on a processor, for integrating the operations of a workload management system (WLMS) and an instant capacity (iCAP) system in controlling allocation of iCAP resources distributed among partitions in a computer system, each partition including a local WLMS and a local iCAP system, the method, comprising:

means for determining availability of each local iCAP system to transfer control of its associated iCAP resources to the corresponding local WLMS, wherein usage of each of the iCAP resources is controlled for compliance with specific usage rights or licenses;

means for commanding the transfer when each local iCAP system is available to transfer; and means for determining when the transfer is complete for all partitions, wherein the transfer creates a workload management (WLM) special mode of operation of the computer system, and wherein the WLMS monitors and assigns iCAP resources when in the WLM special mode.

18. The system of claim 17, further comprising means for reading and storing iCAP compliant states, wherein a starting iCAP compliant state is read and stored when the WLM special mode of operation begins.

19. The system of claim 18, further comprising updating and storing as an update iCAP compliant state, the starting iCAP compliant state after activation of desired iCAP resources in the partitions.

20. The system of claim 17, further comprising:

means for determining the status of each of the local WLMS; and means for asynchronously shutting down WLM special mode if one of the local WLMS is inactivated.

21. The system of claim 17, further comprising means for normal termination of the WLM special mode.

* * * * *